(12) United States Patent
Brazier et al.

(10) Patent No.: US 7,566,374 B2
(45) Date of Patent: Jul. 28, 2009

(54) METHOD OF MAKING A MAT

(75) Inventors: Peter C. Brazier, Bedfordshire (GB);
Thomas A. P. Brock, Manchester (GB);
Robert C. Kerr, LaGrange, GA (US);
Bhawan Patel, Lancashire (GB);
Flemming Bojstrup, Homslet (DK);
Patrick Morel, Gometz la Ville (FR)

(73) Assignee: Milliken & Company, Spartanburg, SC (US)

( * ) Notice: Subject to any disclaimer, the term of this patent is extended or adjusted under 35 U.S.C. 154(b) by 16 days.

(21) Appl. No.: 10/516,905

(22) PCT Filed: Jun. 12, 2003

(86) PCT No.: PCT/GB03/02525
§ 371 (c)(1),
(2), (4) Date: Jun. 30, 2005

(87) PCT Pub. No.: WO03/106761
PCT Pub. Date: Dec. 24, 2003

(65) Prior Publication Data
US 2006/0151908 A1  Jul. 13, 2006

(30) Foreign Application Priority Data

Jun. 13, 2002 (GB) ................................ 0213568.9
Jun. 13, 2002 (GB) ................................ 0214103.4
Mar. 12, 2003 (GB) ................................ 0305867.4
Apr. 11, 2003 (GB) ................................ 0308398.7

(51) Int. Cl.
*B32B 37/24* (2006.01)
*B30B 5/02* (2006.01)
*B30B 5/04* (2006.01)

(52) U.S. Cl. ................ 156/62.2; 156/311; 156/331.4; 156/583.3; 156/583.4; 156/583.5; 264/314; 425/364 R; 425/389

(58) Field of Classification Search ............ 156/62.2, 156/72, 297, 311, 331.4, 583.3, 583.4, 583.5; 264/109, 112, 113, 120, 123, 313, 314; 425/364 R, 425/389
See application file for complete search history.

(56) References Cited

U.S. PATENT DOCUMENTS 3,005,230 A * 10/1961 Hutter ..................... 425/406
3,801,421 A *  4/1974 Allen et al. ................ 428/17

(Continued)

FOREIGN PATENT DOCUMENTS

EP       0367441 A2 * 10/1989

(Continued)

*Primary Examiner*—Richard Crispino
*Assistant Examiner*—Michael A Tolin
(74) *Attorney, Agent, or Firm*—Jeffrey E. Bacon

(57) ABSTRACT

A method of making a mat with a textile surface and an elastomer backing is provided. The method includes mixing elastomer crumbs and a binder, depositing the crumb/binder mixture in a layer (22), placing a textile surface element (34) on the layer to form a mat assembly, and pressing the mat assembly in a press (9) while setting the binder. The elastomer crumbs are consolidated to form an elastomer backing (2) that includes voids between the elastomer crumbs, and the textile surface element is bonded to the elastomer backing to form the upper textile layer (1) of the mat.

29 Claims, 4 Drawing Sheets

U.S. PATENT DOCUMENTS

| | | | |
|---|---|---|---|
| 4,109,039 A | | 8/1978 | McCoy |
| 4,112,176 A | | 9/1978 | Bailey |
| 4,400,414 A | * | 8/1983 | DeMott ................. 427/210 |
| 4,657,790 A | * | 4/1987 | Wing et al. ............. 427/374.1 |
| 5,057,175 A | * | 10/1991 | Ashton ................. 156/202 |
| 5,170,526 A | | 12/1992 | Murray |
| 5,332,457 A | * | 7/1994 | Katoh et al. ............. 156/72 |
| 5,800,664 A | * | 9/1998 | Covert ................. 156/304.4 |
| 5,932,317 A | * | 8/1999 | Kerr ..................... 428/192 |
| 6,296,733 B1 | * | 10/2001 | Hudkins et al. ......... 156/245 |
| 6,316,075 B1 | * | 11/2001 | Desai et al. ............. 428/87 |
| 6,342,115 B1 | * | 1/2002 | Pourmand et al. ....... 156/64 |
| 6,623,840 B2 | | 9/2003 | Hainbach |
| 6,821,623 B2 | | 11/2004 | Kvesic |
| 2003/0072911 A1 | | 4/2003 | Higgins et al. |
| 2003/0096079 A1 | * | 5/2003 | Messina et al. ........... 428/85 |
| 2003/0170420 A1 | | 9/2003 | Higgins et al. |
| 2003/0203152 A1 | | 10/2003 | Higgins et al. |
| 2004/0022985 A1 | | 2/2004 | Higgins et al. |
| 2004/0022991 A1 | | 2/2004 | Higgins et al. |
| 2004/0022994 A1 | | 2/2004 | Higgins et al. |
| 2005/0031829 A1 | | 2/2005 | Crenshaw et al. |

FOREIGN PATENT DOCUMENTS

| | | |
|---|---|---|
| EP | 0581571 B1 | 7/1998 |
| FR | 2763880 A1 | 12/1998 |
| GB | 1373923 A1 | 11/1974 |
| JP | 030023816 A | 1/1991 |
| JP | 030244684 A | 10/1991 |
| JP | 050050541 A | 3/1993 |
| JP | 070100048 A | 4/1995 |
| JP | 070275107 A | 10/1995 |
| WO | WO 96/11106 A1 | 4/1996 |
| WO | WO 96/22413 A1 | 7/1996 |
| WO | WO 96/38298 A1 | 12/1996 |
| WO | WO 03/014462 A1 | 2/2003 |

* cited by examiner

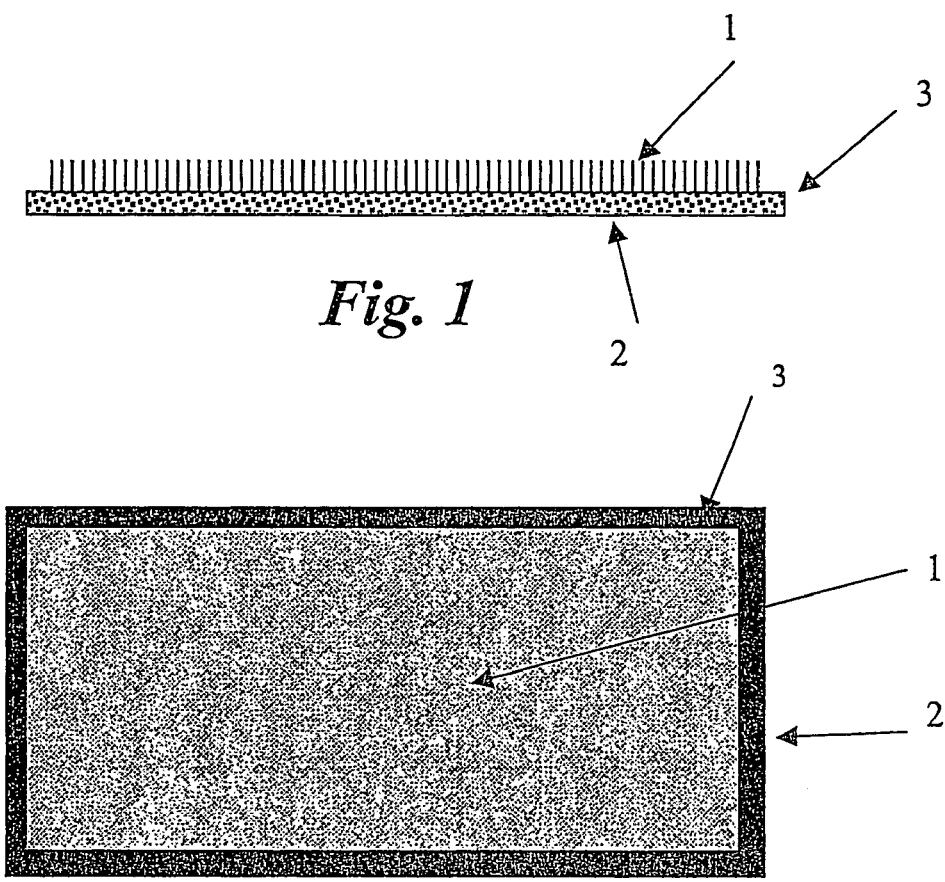
Fig. 1
Fig. 2
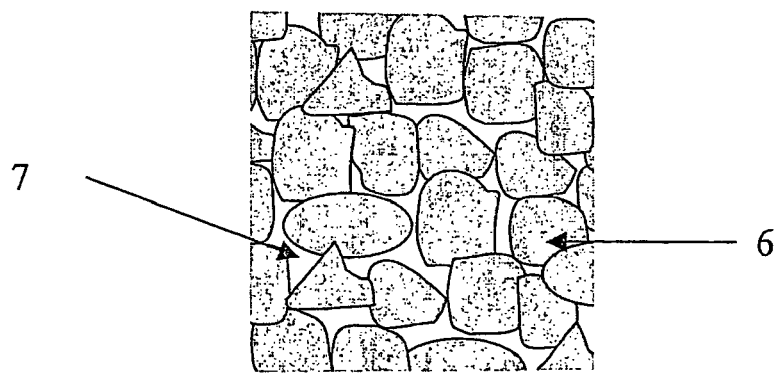
Fig. 3

Granules
1.5 mm screen size
8% binder 457
5% yellow oxide
2 PSI

Granules
1.5 mm screen size
8% binder 457
5% yellow oxide
10 PSI

Granules
1.5 mm screen size
8% binder 457
5% yellow oxide
Compression
Moulded in a 20
tonne press Prior art compression
moulded mat
("Royal")

METHOD OF MAKING A MAT

TECHNICAL FIELD

The present invention relates to a method of making a mat having a textile surface and an elastomer backing.

In particular, but not exclusively, the invention relates to a method of making a floor mat. The invention also relates to methods of making other mats and mat-like products, including for example table mats and bar runners.

BACKGROUND TO THE INVENTION

Floor mats having a textile surface and a rubber backing are very well known and have been manufactured for many years. Typically, such mats include a tufted pile textile surface, for example of nylon, cotton, polypropylene or a mixture of such fibres, which is bonded to a rubber backing sheet. Such mats are usually made by bonding the textile surface layer to a sheet of uncured rubber in a heated press. The heat from the press vulcanises (cures) the rubber and at the same time bonds it to the textile layer. A process for manufacturing such mats is described in EP 0 367 441 A. Such mats have very good dust control characteristics, are highly effective at removing dirt and moisture from the feet of pedestrians, and have a good feel and appearance. The mats are also washable, extremely durable, highly flexible and lie flat on the floor.

Rubber backed floor mats with surfaces made of other textiles are also known. These textiles may include knitted, woven, or non-woven fabrics (such as needle felts or spun-bonded fabrics), with or without a pile or raised nap, as well as flocked surfaces. The textile surface may be bonded under pressure to a rubber backing sheet, using a process similar to that described above. Other mats and mat-like products, such as table mats and bar runners, have also been made in a similar fashion.

One disadvantage of the mats described above is that they tend to be rather expensive, owing to the relatively high cost of the rubber backing material. As a result, those mats have enjoyed only limited commercial success in certain market sectors, where a lower cost product is required. For example, in the commercial and retail or residential market sectors, rubber backed dust control mats have achieved a market penetration of only about 5% of total mat sales, the remainder of the matting sold into this market sector being either unbacked or backed with PVC or latex.

However, PVC and latex backed mats do have a number of disadvantages as compared with conventional rubber backed mats. In particular, PVC backed mats have poor flexibility, especially at low temperatures, and after being unrolled such mats often do not lie flat on the floor. They also have an inferior appearance and feel when compared with rubber backed mats, can become brittle with age, and can have poor resistance to movement when placed on top of carpet. There are also growing environmental concerns associated with the manufacture and disposal of PVC backed mats. These disadvantages have, however, been tolerated in certain market sectors, owing to the lower cost of the mats.

Recycled rubber has been used effectively at a low cost substitute for virgin rubber in certain applications. Some examples of such applications are discussed below:

EP 0135595 describes a method for manufacturing a floor covering in the form of a web, which may be used as a sports surface. The web consists of a lower textile base and an upper layer of disintegrated waste rubber and/or granules of new or scrap rubber that has been mixed with a pre-polymer as a solvent-free single-component binder, spread on a conveyor belt, compressed and subsequently cured.

DE 4212757 describes a moulded component forming an elastic layer and comprising a mixture of granulated recycled material and binders. The component has three compressed layers of uniform thickness bonded together at their interfaces. Upper and middle layers are formed by flat plates and the lower layer has hump-shaped feet separated by grooves. The individual layers are formed in different materials with different particle sizes. The component can be used as a covering, for example for floors.

A mat with a compression moulded rubber crumb backing and having a flock surface applied to the backing is available under the brand name "Royal mat". The compression moulded backing is made by mixing rubber crumb with a binder and then compressing a layer of the mixture in a mould at a high pressure while the binder bonds the crumbs together. The flocked textile surface is subsequently applied to the backing using an adhesive.

Compression moulding produces a rubber crumb backing that has a high density and low deformability. This makes the mat heavy and inflexible, with the result that it does not conform well to the shape of the floor beneath it. The mat does not therefore have the performance characteristics of a conventional rubber backed mat.

Rubber carpet underlay manufactured from lightly bonded crumb rubber is also known. The underlay is however made without any significant pressure and as a result it is not sufficiently well bonded to make it durable enough for use as a mat backing.

Notwithstanding the aforesaid applications, recycled rubber does not have the same performance characteristics as virgin rubber. In particular, it has a lower tear resistance and a higher stiffness, owing to the presence of a binder material. As a result, recycled rubber has not generally been thought suitable for use as the backing material for a mat, since it has been thought to offer no significant advantages over PVC.

It is therefore desirable to provide a method of making a mat using recycled rubber, which produces a mat that overcomes the performance shortcomings of PVC backed mats and compression moulded mats and avoids the relatively high cost associated with conventional rubber-backed mats.

DISCLOSURE OF THE INVENTION

According to one aspect of the present invention there is provided a method of making a mat with a textile surface and an elastomer backing, the method including mixing elastomer crumbs and a binder, depositing the crumb/binder mixture in a layer, placing a textile surface element on the layer to form a mat assembly, and pressing the mat assembly while setting the binder, so that the elastomer crumbs are consolidated to form an elastomer backing that includes voids between the elastomer crumbs, and the textile surface element is bonded to the elastomer backing.

Throughout this specification the term "crumb" has the normal meaning in the rubber industry of any "broken down" rubber: thus, a crumb of rubber can be any size in a range that includes powder, granules and chips. The term "powder" means crumb that will pass a 2 mm mesh or crumb with a maximum dimension of 2 mm as the context requires. "Granule" means crumb that will pass a 6 mm mesh or crumb with a maximum dimension of 6 mm, as the context requires. Granules may include some powder but are generally larger than powder and have a weight average size that is near to the maximum of the size specification for the granule. "Chips" means crumbs that are larger than granules.

It should be noted that any batch of rubber crumb normally contains a proportion of crumbs smaller than the nominal crumb size. Thus, for example, we found that crumb made using a granulator with a 1.5 mm screen (i.e. having holes of diameter 1.5 mm) had a distribution of crumb sizes, measured by using standard "Endecott" test sieves (ISO3310-1:2200, BE410-1:2000, ASTM E11:95), comprising by weight 72.82% in the range 1.0-2.0 mm, 17.45% of 0.71-1.0 mm, 6.90% of 0.5-0.71 mm, 2.65% of 0.25-0.5 mm and 0.18% of 0-0.25 mm. Therefore, in the present specification, where we refer to 1.5 mm crumb, we mean crumb made using a granulator with a 1.5 mm screen. Where we refer to "setting" the binder, we mean either curing or heat-setting the binder, depending on the nature of the binder.

We have found, surprisingly, that it is possible to make a mat having superior performance characteristics with a backing made of elastomer crumb and a binder. In particular, we have found that by carefully controlling the pressure in the production process, we can produce a mat with voids between the elastomer crumbs in the backing, which meets or exceeds the performance of mats with a PVC backing layer and existing compression moulded mats. The mat can be produced in a single process, using relatively inexpensive materials (for example, recycled rubber from old mats), and therefore provides a high performance but low cost alternative to conventional rubber-backed mats, compression moulded mats and PVC mats.

The presence of voids between the crumbs increases the flexibility of the backing, thereby compensating for the stiffening effect of the binder and providing a deformability that is comparable to that of a conventional rubber backing. The mat is more flexible than both compression moulded rubber backed mats and PVC backed mats, in the latter case particularly at low temperatures. The tear strength of the backing is however much greater than that of granulated rubber carpet underlay, and is adequate for most mat backings, even in unsupported border regions of the mat. The backing is also extremely stable when placed on top of carpet, probably because the pile fibres of the carpet are gripped in the numerous small gaps between the crumbs of the backing. It is also relatively light and it has good fire resistance compared to a conventional rubber backed mat.

Advantageously, the mat assembly is pressed at a pressure of up to 16 psig (110 kPa), preferably in the range 2-8 psig (14-55 kPa).

Advantageously, the mat assembly is pressed such that the thickness of the elastomer backing is in the range 60-100%, preferably 65-80%, of the thickness of the un-pressed crumb/binder layer.

Advantageously, the mat assembly is pressed at a temperature of 50° C. to 200° C., preferably 110° C. to 140° C., and most preferably approximately 125° C.

The mat assembly may be pressed in a plurality of stages including a low temperature stage and a higher temperature stage. If the binder is selected from the group comprising thermosetting and water curable polymeric materials and mixtures thereof, the mat assembly is preferably pressed in a plurality of stages including at least one low temperature stage followed by at least one higher temperature stage. Alternatively, if the binder is selected from the group comprising thermoplastic polymeric materials, hot melt binders and mixtures thereof, the mat assembly is preferably pressed in a plurality of stages including at least one high temperature stage followed by at least one lower temperature stage.

The mat assembly may be pressed in a press having an inflatable diaphragm. The press may be a heated press, which may include a plurality of zones, including a low temperature zone and a higher temperature zone. Advantageously, the mat assembly is transported through the press in a plurality of steps, so that it is pressed sequentially in each of the plurality of zones. The mat assembly may be transported through the press on a conveyor, and the crumb/binder mixture may be deposited on the conveyor using a spreader device that moves at a constant speed relative to the conveyor. Advantageously, the spreader device includes a vibrating doctor blade.

A continuous textile element may be laid on the crumb/binder layer. Alternatively, separate textile elements may be laid consecutively on the crumb/binder layer. The elastomer is preferably rubber, and more preferably nitrile rubber. This backing material provides better performance than PVC at a cost that may be less than PVC and without the environmental concerns associated with PVC. Nitrile rubber is a term used to describe a compounded rubber mixture of which the main polymeric content is an acrylonitrile butadiene copolymer. It may also contain fillers such as carbon black, a curing system, plasticisers and other ancillary components.

Advantageously, the elastomer backing exhibits a deformability from at least 14% as measured by the test herein defined. Preferably the deformability is 14 to 50%, more preferably 14 to 25%.

Advantageously, the elastomer backing has a bulk density in the range 45 to 70%, preferably 55 to 70%, of the elastomer from which the crumbs are made.

Advantageously, the backing has a density of less than 1 g/cm$^3$. The backing preferably has a density in the range 0.5 to 0.9 g/cm$^3$, more preferably 0.7 to 0.9 g/cm$^3$.

Advantageously, the backing exhibits a tear resistance strength of at least 0.8 N/mm$^2$. Preferably the tear resistance strength is about 1.5 N/mm$^2$ or higher.

The mat backing preferably has a thickness of a least 1 mm. The crumb size may be within the range of about 0.8 mm to about 6 mm, with crumb sizes less than about 5 mm diameter being generally preferred. More specifically, crumb sizes within the range of about 2 mm to about 4 mm, and preferably sizes of about 3 mm or less, have been found to be particularly advantageous for use. The choice of crumb size to be used, and the relative percentage of powder used, if any, depends somewhat upon the desired performance characteristics of the mat and the desired manufacturing cost. Because use of small crumb (say, for example, powder less than about 1 mm) tends to require increased use of binder and thereby increased manufacturing cost, limiting use of crumb to small granules and large powder (e.g., crumb within the range of about 1 mm to about 4 mm or, preferably, predominantly crumb within the range of about 2 mm to about 3 mm) may be preferred if minimizing manufacturing cost is important.

The use of powdered crumb increases the strength of the resulting backing, and generates a smoother appearance, but increases the cost of production, both in the need for additional grinding and in the need for the use of additional binder. Accordingly, the amount of powdered crumb can be adjusted to suit the needs of the product; typically, including powder of at least 10% by weight has been found useful. The elastomer crumb is preferably at least partially comprised of crumbed vulcanised rubber. The rubber is preferably nitrile rubber. The elastomer crumb may include a combination of crumb sizes in addition to the powdered elastomer crumb.

The binder may be comprised of any of several different materials. For example, the binder may be a polyurethane MDI binder. Preferably it is selected from the group consisting of 4,4-methylene di-p-phenylene isocyanate (MDI) polyurethane one- and two-component adhesives. Advantageously the binder is a solvent-free, one component (moisture curing) polyurethane adhesive. Such binder may typically be present at a level of from 4 to 12%. Alternatively the binder may be a hot melt binder and is desirably present at a level of from 3 to 10%. When powdered elastomer crumb is included in the crumb/binder mixture and the binder is a one component polyurethane adhesive, the binder level preferably lies in the range 9 to 20%, as may be determined by experimentation. Exceptionally, binder levels of up to 25% may be employed.

The crumb/binder mixture may include powdered or liquid additives selected from the group consisting of: anti-microbial additives, anti-flammability additives, pigments such as iron oxide, and anti-static additives such as carbon fibres. This provides added functionality to the mat.

Advantageously, a crumb rubber border extending beyond the periphery of the textile surface is provided on at least two opposite edges of the mat, by spreading the crumb/binder mixture over a larger area than the textile element or elements. The crumb rubber border may be provided around the entire periphery of the mat.

Advantageously, the textile surface comprises a tufted pile textile, including tufts of yarn tufted into a tufting substrate. Alternatively, the textile surface comprises a knitted, woven or non-woven textile, or a flock surface.

An edging strip may be bonded to the elastomer backing adjacent at least one edge thereof. Advantageously, the textile surface element partially overlaps and is bonded to the edging strip.

The mat may be a floor mat, a table mat, a bar runner or any other mat or mat-like product.

Often, commercial or retail floor mats are backed with PVC. The advantage of mats made according to the present invention and backed with elastomer crumb is that they are similar in cost of production to PVC mats and have superior appearance and feel to PVC mats. Furthermore, they have much better low temperature flexibility than PVC, which means that the elastomer crumb backed mat lies better on the floor than a PVC backed mat. The mat is also less liable to become brittle with age than a PVC backed mat. In tests, we found that crumb rubber backed mats remained sufficiently flexible to unroll and lie flat immediately after being removed from storage at minus 16° C. Mats made according to the invention also unroll more easily than PVC mats at higher temperatures and tend to give off less of a distinctive odour of rubber than conventional vulcanised rubber mats. The ability to roll up is very important for commercial mats as they are often over 6 m long and can be as long as 25 m. It is also important for retail mats as they are frequently sold in rolled up form to enable the larger sizes to be carried home. The lie flatness or amount of rippling of the mat edges after both mats had been rolled up was visibly superior in the mat made according to the invention.

The invention will now be further described by way of example only and with reference to the drawings, which are briefly described as follows:

FIG. 1 is a cross-sectional side elevation of a mat;

FIG. 2 is a top plan view of the mat;

FIG. 3 is an enlarged partial bottom view of the mat;

Figure 4:
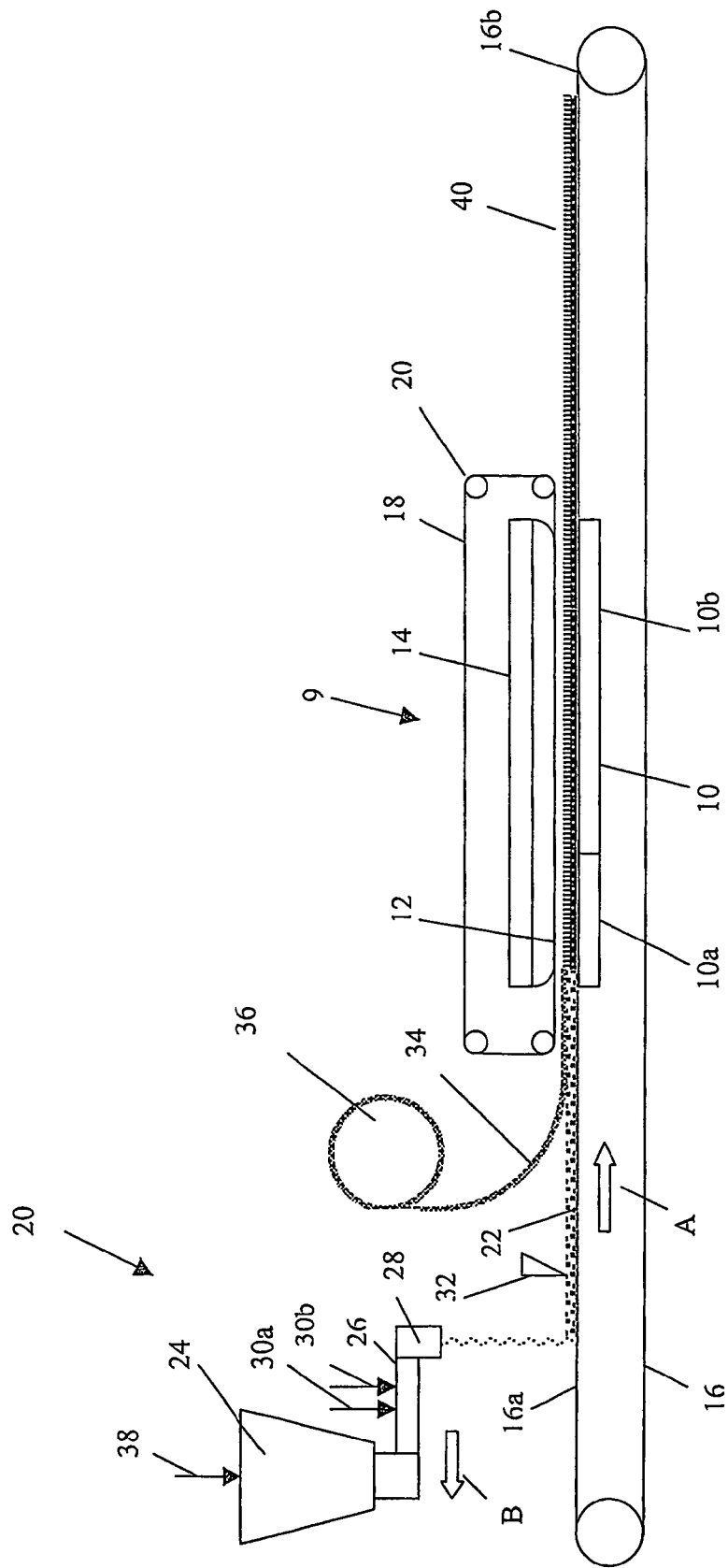
FIG. 4 is a side elevation of a machine for manufacturing the mat.

With reference to FIGS. 1 and 2, a mat is shown with a textile surface 1 bonded to a nitrile rubber crumb backing 2. In this case, the textile surface is shown as a tufted pile textile. It should be understood however that other textiles may also be used including, for example, knitted, woven and non-woven fabrics, as well as flocked surfaces.

The textile surface 1 includes a tufted pile, which is tufted onto a substrate (or primary backing), for example of woven or non-woven polyester or polypropylene. The tufted pile can be cut, looped or both, and typically consists of cut pile. Suitable textile materials include polypropylene, nylon, cotton, blends thereof and any other fibres or yarns that can be tufted into a tufting substrate to form a pile surface. The yarn may be solution dyed or the mats may be printed during or after manufacture.

The textile surface 1 is slightly smaller than the backing, leaving a rubber crumb border 3 that extends around the periphery of the mat. Alternatively, the border strips may be omitted entirely or two border strips may be provided on opposite sides of the mat, with no borders at the ends of the mat. This latter construction is preferred for rolls or matting. The width of the mat and the other dimensions may be any of those conventionally used for commercial or retail mats or any other suitable dimensions. For mats with a low backing thickness, it is advantageous for the textile surface to cover the whole upper surface of the backing. For aesthetic reasons, such mats are often provided with what is termed an "optical border", which is a dark printed area around the periphery of the mat.

FIG. 3 shows the rubber crumb backing 2 in more detail. It generally comprises a series of rubber crumbs 6 bonded together with a binder (not shown), which bonds each crumb to the adjacent crumbs. The binder also bonds the backing 2 to the textile surface 1. A plurality of voids 7 exist between the rubber crumbs, some of which may be partially or fully filled with the binder. Owing to the presence of the voids, the bulk density of the backing layer is less than the density of the solid rubber material of which the crumbs are composed, and is typically about 45%-70% of the solid rubber density.

Generally, any batch of granules will include a distribution of granule sizes, the average granule size being significantly less than the maximum that will pass through the mesh. For example, we have found when using a 4 mm mesh that the majority of the granules lie in the range 1 to 3 mm (i.e. they will pass through a 3 mm mesh but not a 1 mm mesh). Further, it should be noted that the granules tend to be irregular in shape and often have a thickness that is considerably less than the nominal granule size. Thus, with the compaction that occurs during the pressing process, we have found that a backing layer can be made using granules having a nominal size larger than the thickness of the backing layer.

The crumb is preferably nitrile rubber, and is preferably rubber from recycled industrial mats. The rental industrial segment is an ideal source of raw material for the crumb because it ensures that low bleed, low staining nitrile rubber crumb is used as the starting point for the production of the mats. The crumb may include some flock from the textile surface of the original mat, perhaps in bonding relationship to the crumb. The flock content should preferably be as low as possible, most preferably less than 10% by weight.

The crumb size may range from about 0.01 to 8 mm. Generally, the size is selected to be as large as possible for the use and properties required. However, crumb larger than granules (i.e. larger than about 6 mm) may be regarded as excessively granular, and crumb that is smaller than about 0.8 mm may be regarded as excessively costly (both in terms of supply and increased binder requirements). Generally, it has been found that crumb within the range of about 2 mm to about 4 mm is preferred. Specifically, crumb that passes a 4 mm aperture screen (i.e. crumb predominantly of about 3 mm or less) has been found to be particularly useful for floor mats. In accordance with the teachings herein, powder (i.e. crumb less than 2 mm in size) may be used as desired. Crumb size can be chosen to give different amounts of resilience in the mat. We have found that larger crumbs provide greater resilience.

Crumb may be mixed with powder of the same material or a different material to provide a greater tear resistance. We have found that the powder increases the tensile strength for a given binder level. The use of other additives in powdered or liquid form may provide the same or different advantages. Suitable additives include, but are not limited to, anti-microbial materials, anti-flammability additives, odorants, colorants or pigments such as iron oxide powder, anti-static additives such as carbon fibres, fillers and other generally known additives.

The binder may be either a heat setting or thermoplastic type. Depending on the process utilized to manufacture the backing, the binder can be in liquid or powder form. Preferably, the binder is selected from one of the following types: polyurethane reactive hotmelts, copolyester or copolyamide reactive and thermoplastic hotmelts, and 4,4-methylene di-p-phenylene isocyanate (MDI) polyurethane one- and two-component adhesives.

It is important that the binder has good adhesive properties to ensure that the crumb is well bound, and that sufficient free binder is provided to be capable of forming a physical or chemical bond to the textile surface. The binder should also exhibit sufficient cohesive strength to give the backing sufficient strength. When a tufted pile textile is used, the binder should be one that cures or sets at a sufficiently low temperature and pressure that pile crush is substantially avoided.

The binder may contain any of the known cross linkers or curing accelerators to suit the process and the desired properties of the mat being manufactured and the rubber being used.

The binder performs the dual function of holding together the crumb to form a backing and bonding the backing to the textile surface of the mat. To perform both functions adequately we have found that binder levels should be in the range 2 to 12% by weight of the crumbs when chips or granules are used. Use of less than 2% binder gives a very poor tensile strength in the backing. Use of greater than 12% gives a stiff backing and causes a skin to form. When rubber crumb powder is added to the backing, the amount of binder needed for optimal properties is greater due to the higher surface area of the rubber crumb powder on a weight for weight basis. For powders, especially finer rubber crumb powders of size less than 0.5 mm, the quantity of binder should lie in the range 9 to 20%, depending upon the size and quantity of the powder added. Because the powder addition increases the tensile strength, inclusion of a little powder can improve the strength of the backing without increasing the binder content excessively.

Generally, there is an inverse relationship between the binder content and size of the rubber crumb, and between the binder content and pressure applied to the rubber crumb while forming the backing layer. Therefore, as the crumb size and the pressure increase, the binder content decreases. The binder content also depends on other factors, such as the type of binder, the rubber material used and the type of fabric, and can be determined by routine experimentation.

For example, the binder may be a liquid polyurethane MDI binder, in which case it is preferably present at a level of from 4 to 12% if the backing consists primarily of chips or granules. The binder may contain further additives that are in liquid form and are compatible with the binder, such as colorants, plasticisers and perfumes. The binder may also contain other additives, such as those listed as crumb additives, provided that they are suitable for addition in a liquid medium.

The binder may alternatively be a thermoplastic or thermosetting hot melt powder, in which case it is preferably present at a level from 3 to 10% if the backing consists primarily of chips or granules. A powdered binder may also contain other additives such as those listed as crumb additives, provided that they are suitable for addition in a powder medium.

The preferred ranges for binder content may thus be summarized as follows:

Backing of chips/granules: binder content in range 2 to 12%, preferably 4 to 12% with an MDI binder or 3 to 10% with a hot melt binder.

Backing with ≧10% powder: binder content in range 9 to 20%, preferably 14% or more.

Exceptionally, a binder content of up to 25% may be employed, even though this may lead to the formation of a skin.

Examples of mat products according to the invention are given in Table 1.

TABLE 1

| | Example Products | | | |
|---|---|---|---|---|
| Property | Floor mat—tufted polypropylene fabric on rubber powder backing | Floor mat—tufted nylon on rubber granule backing with printed optical borders | Bar runner—knitted polyester fabric on rubber powder backing | Poster mat—woven polyester on rubber granule backing |
| Textile Type | Polypropylene | Nylon 6 | Polyester | Polyester |
| Weight | 500 gm$^{-2}$ | 600 gm$^{-2}$ | 237 gm$^{-2}$ | 200 gm$^{-2}$ |
| Method | Tufted | Tufted | Knitted | Woven |
| Tufting substrate | 80 gm$^{-2}$ Polyback | 140 gm$^{-2}$ Colback | n/a | n/a |
| Backing Material (screen size) | 0.8 mm powder | 3 mm granule | 0.5 mm powder | 4 mm granule |
| Thickness | 1.5 mm | 4.0 mm | 1.0 mm | 1.5 mm |
| Weight | 2000 gm$^{-2}$ | 3000 gm$^{-2}$ | 1333 gm$^{-2}$ | 2000 gm$^{-2}$ |
| Total Weight | 2580 gm$^{-2}$ | 3740 gm$^{-2}$ | 1570 gm$^{-2}$ | 2200 gm$^{-2}$ |
| Borders | 15 mm | None | None | None | gm$^{-2}$ is grams per square meter

A process for making the mat of FIGS. 1-3 will now be described with reference to FIG. 4, which is a sectional side view of a machine for manufacturing mats, showing a mat during manufacture. The machine includes a conventional heated press 9 that comprises a heated metal platen 10, above which there is an inflatable diaphragm 12, mounted on a frame 14. The platen 10 is divided into a first section 10a and a second section 10b, which can be heated to different controlled temperatures. The inflatable diaphragm 12 is arranged to be inflated to a controlled pressure and subsequently evacuated under automatic control.

A motor driven conveyor belt 16 extends around and beyond the heated platen 10, and includes an input portion 16a on one side of the press 9 on which mats can be laid up, and an output portion 16b on the opposite side of the press, on which mats are transferred out of the press 9. The belt 16 is made, for example, of PTFE-coated woven glass fabric, to prevent the mats from sticking to it. In use, the conveyor belt 16 advances stepwise in the direction of arrow A, so that mats are transferred through the press in a number of discrete steps.

A release belt 18 is mounted on rollers 20 and arranged for rotation around the diaphragm 12 and the frame 14, as the conveyor belt 16 advances. The release belt 18 is made, for example, of PTFE-coated woven glass fabric, to prevent the rubber backing sheet of the mat from sticking to it or the diaphragm 12.

A crumb mixing and spreading apparatus 20 is mounted above the input side 16a of the conveyor belt, to deposit a layer 22 of a rubber crumb and binder mixture on the belt. The apparatus 20 includes a hopper 24 for rubber crumb, a feed tube 26 containing a feed/mixing screw (not shown) and a spreader 28 for spreading a layer of the rubber crumb/binder mixture on the belt 16. The feed tube 26 includes inlets 30a,30b for a liquid binder and an activator (water plus a catalyst), which are fed into the feed tube 26 at a controlled rate using metered pumps (not shown). The binder and activator are mixed with the rubber crumb in the feed tube 26 and the mixture is deposited onto the belt 16 through the spreader 28.

The spreader 28 is arranged to deposit a layer of the crumb/binder mixture having a substantially uniform thickness. To achieve this, it may consist of a distributor that distributes the mixture evenly across the width of the belt 16, or alternatively it can be arranged for reciprocating movement across the width of the belt (in a direction perpendicular to the plane of the drawing).

To ensure that the crumb/binder layer 22 has a uniform thickness, a doctor blade 32 is mounted a fixed distance above the belt 16, between the spreading apparatus 20 and the press 9. The doctor blade 32 is preferably arranged to vibrate from side to side (in a direction perpendicular to the plane of the drawing), and/or up and down (vertically, in the plane of the drawing), to prevent the crumb material from catching and building up under the blade.

The crumb spreading apparatus 20 and the doctor blade 32 are mounted on a motor driven carriage (not shown) for backwards and forwards movement (to the left and right in the plane of the drawing). When the diaphragm is inflated, belt 16 is stationary, the carriage moves slowly backwards (to the left) in the direction of arrow B, typically at a speed of about 1 cm/sec, to deposit a layer of the crumb/binder mixture on the belt 16. When the diaphragm is deflated the belt advances, at which time the carriage also moves forwards but at a slightly slower speed, so that it maintains a constant speed relative to the belt. Thus, for example, if the belt advances at 100 cm/sec, the carriage will move forwards at 99 cm/sec, so that its speed relative to the belt is always 1 cm/sec. In this way, a uniform layer 22 of the crumb/binder mixture can be deposited continuously on the belt 16.

Fabric 34 for the textile layer of the mat is held on a reel 36 located between the doctor blade 32 and the press 9. The fabric 34 is laid on the crumb/binder layer 22 as the belt 16 advances, creating a composite mat assembly that is drawn into the press 9.

Optionally, a take-up reel (not shown) may be provided above the output portion 16b of the belt, for removing the completed mat product from the machine. Alternatively, the finished mat can be cut up into individual mat portions, which can then be removed and stacked. The machine may include a cutter for cutting the mat into individual mat portions and/or for trimming the longitudinal (side) edges of the mat.

In operation, rubber crumb 38 is fed into the hopper 24 and binder/activator supplies are connected to the inlets 30a,30b of the feed tube 26. The press 9 is preheated to the required temperatures: for example the first portion 10a of the platen may be heated to a temperature of about 60° C., while the second portion 10b is heated to a temperature of about 125° C.

The feed/mixing screw and the metering pumps are activated and rubber crumb is fed through the feed tube 26 and mixed with the required quantity of binder/activator. This mixture is deposited onto the belt 16 while at the same time the carriage carrying the spreading apparatus 20 and the doctor blade 32 is driven backwards, to spread an even layer of the mixture on the belt.

When a layer of sufficient size has been deposited, the conveyor belt motor is activated, driving the belt 16 forwards in the direction of the arrow A. As the belt 16 moves, the fabric 34 is laid on the crumb/binder layer 22 and the crumb/fabric composite is introduced partially into the press, so that it lies between the diaphragm 12 and the first part 10a of the platen. The belt then stops and the diaphragm 12 is inflated, for example to a pressure of about 4 psi (28 kPa), to press the fabric 34 into the crumb/binder layer 22 and at the same time compress the crumb/binder layer. However, as the first part 10a of the platen is at a relatively low temperature, the binder is not fully cured at this stage. This helps to prevent the formation of permanent boundaries or steps between adjacent sections of the finished mat. In the meantime, the spreading apparatus 20 continues to deposit a layer 22 of the crumb/binder mixture on the input part 16a of the belt.

After a predetermined time (for example about 2 minutes), the diaphragm 12 is deflated and the belt 16 is advanced a further step, carrying another section of the mat assembly into the first part of the press while moving the section that was in the first part further into the press, so that it lies between the diaphragm 12 and the second part 10b of the platen, which is at a higher temperature. The diaphragm is then inflated again and the section of the mat assembly that is in the first part of the press is subjected a low temperature pressing as described above, while the section that is now in the second part of the press is subjected a high temperature pressing, which completes the setting of the binder. The time during which the diaphragm is deflated is kept as short as possible (for example about 5 seconds), so that the pressure applied by the press is released only for the minimum amount of time.

The pressing process is repeated continuously, so that the completed mat product 40 emerges in stages from the press on the output portion 16b of the conveyor belt, and is either wound onto a reel or is cut into individual mats and stacked, as described above.

Various modifications of the process described above are of course possible. For example, instead of using a continuous length of fabric to form the textile layer, individual fabric portions can be laid on the crumb/binder layer to create separate mats. These fabric portions can be laid either manually or automatically, using a feeder device. By leaving gaps between the fabric portions, rubber borders can be provided at the ends of the mats.

The spreading apparatus may include means for controlling the temperature of the crumb/binder mixture in the feed tube 26, to prevent the binder from setting too rapidly. For example, the feed tube may be equipped with a jacket for cooling water. Alternatively, the rate at which the binder cures can be controlled by regulating the amount of activator added to the binder.

Instead of using a liquid binder, a thermoplastic or thermosetting hot melt powder binder can be used, in which case it may be mixed in with the rubber crumb in the hopper 24. The inlets 30a,30b on the feed tube 26 are not then required. If a thermosetting hot melt powder binder is used, the first portion 10a of the platen may be set to a higher temperature than the second part 10b to melt the binder rapidly, and the second part 10b may be set at a lower temperature to maintain the compression of the crumb/binder layer 22 while the binder cools and cures.

Although it is generally preferable that the press has the diaphragm above the platen, an inverted press arrangement with the platen above the diaphragm can also be used.

We have found that by using the process described above, we can control the flexibility and strength of the backing by adjusting the pressure applied to the backing in the press. By increasing the pressure the tensile strength of the backing can be increased, and by reducing the pressure the flexibility of the backing can be increased. The desired performance characteristics of the backing can thus be achieved by careful control of the backing pressure.

Also, when tufted pile textiles are used, the problem of pile crush can be substantially avoided. This is because the press operates at a much lower pressure (typically, 4 psig/28 kPa) and temperature (about 125° C.) than is usual in a conventional mat presses, which typically operate at a pressure of 20 to 40 psig (140 to 280 kPa) or higher and at a temperature above 160° C. It may be possible to operate the press at even lower temperature (for example down to about 50° C.) by the use of suitable binders. The lower pressure and temperature are possible because the rubber crumb is already vulcanised and the heat and pressure only have to be sufficient to activate the binder and press the granules together so that they bond to one another and to the fabric layer. In a conventional mat making process, a much higher pressure and temperature is required to soften and cure the vulcanised rubber backing, and to press the fabric layer into the backing.

The mats provide a higher level of comfort and are less dense than compression moulded mats, which have high-density backings. The mat is suited to the retail and commercial segments.

EXAMPLE

A batch of 0.8 to 3 mm rubber crumb was made up by granulating vulcanised nitrile rubber in a granulator with a 3 mm screen and then passing the granules over a 0.8 mm screen to remove fines smaller than 0.8 mm. The granules were then mixed with 8% MDI binder. The mixture was divided up and sample rubber mat backings were made by spreading the crumb mixture evenly with a thickness of 8 mm and then pressing the mixture using an air bag press at various pressures to produce a series of samples. The pressure ranged from no pressure in the air bag through to 45 psig (310 kPa). All the rubber backing samples so formed were set or pressed at 125° C. for 10 minutes. A 25 mm square section was then cut from each sample and its thickness and weight were measured. From this, the density of the sample and the bulk density of the rubber crumb layer were determined, the bulk density being expressed as a percentage of the density of the material from which the crumb was made. The data are given in Table 2.

TABLE 2

Density Test Data

| Sample | Pressure psig (kPa) | Thickness mm | Thickness % | Weight g | Volume cm³ | Density g/cm³ | Bulk density % |
|---|---|---|---|---|---|---|---|
| A | 0 (0) | 8.1 | 100 | 2.8 | 5.06 | 0.55 | 45 |
| B | 2 (14) | 6.2 | 78 | 2.8 | 3.87 | 0.72 | 59 |
| C | 4 (28) | 5.4 | 68 | 2.6 | 3.37 | 0.77 | 63 |
| D | 8 (55) | 5.4 | 68 | 2.9 | 3.37 | 0.86 | 70 |
| E | 16 (110) | 5.0 | 63 | 3.2 | 3.12 | 1.02 | 84 |
| F | 32 (220) | 4.3 | 54 | 2.8 | 2.68 | 1.04 | 85 |
| G | 45 (310) | 3.9 | 49 | 2.7 | 2.43 | 1.11 | 91 |
| Royal | | 7.3 | | 5.0 | 4.56 | 1.10 | 90 |
| Rubber | | | | | | 1.22 | 100 |

The sample referred to as "Royal" is the backing layer of the prior art "Royal" mat referred to previously, which is formed by compression moulding rubber crumb in a fixed platen press to form a very dense backing. The sample referred to as "Rubber" is a solid vulcanised rubber backing of a conventional floor mat.

It can be seen from Table 2 that the density increases as the pressure applied increases. The maximum density achieved was 1.11 g/cm³, equivalent to a bulk density that is 91% of the density of the solid rubber backing. Theoretically, if the backing sample were 100% compressed to remove all voids the density would be about 1.22 g/cm³ to match that of the solid rubber backing of the conventional vulcanised mat referred to as "Rubber". From the table, it can be seen that the density of the compression moulded product (the "Royal" mat) is about the same as the density we obtained using a 45 psi (310 kPa) pressure.

Table 2 also gives a general view of the backing thickness reduction from around 8 mm before to around 4-6 mm after pressing, representing a reduction of up to 50% of its original thickness.

The samples were then tested to determine their deformability. This test was done with a thickness gauge with a 10 mm diameter foot. Weight was applied to the measuring plunger of the thickness gauge. First the new backing thickness was measured with 60 g weight and then the thickness was re-measured with a 800 g weight. The deformability is the percentage fall in the thickness at 60 g loading when the loading pressure was increased to 800 g. The results are shown in Table 3.

TABLE 3

Deformability Test Data

| Sample ID | Pressure | 60 g | 800 g | Deformability % |
|---|---|---|---|---|
| A | 0 | 7.65 | 4.0 | 47.7 |
| B | 2 | 5.70 | 4.3 | 24.6 |
| C | 4 | 5.10 | 4.2 | 17.6 |
| D | 8 | 5.30 | 4.55 | 14.2 |
| E | 16 | 4.80 | 4.3 | 10.4 |
| F | 32 | 4.15 | 3.75 | 9.6 |
| G | 45 | 3.70 | 3.5 | 5.4 |
| Royal | | 7.45 | 7.05 | 5.4 |
| Rubber | | 6.10 | 5.6 | 8.2 |

From Table 2 it can be seen that there is a correlation between formation pressure and density, and from Table 3 it can be seen that there is a correlation between pressure (density) and deformability. This correlation may be expressed as follows: the higher the formation pressure, the higher the density, and the higher the density, the lower the deformability.

In Tables 2, 3 and 4, the sample referred to as "Rubber" is a commercially available vulcanised rubber backed industrial mat. The vulcanised rubber is softer and therefore more deformable than the high pressure crumb backings because of the presence of binder in the latter. The binder material is relatively hard, compared with vulcanised rubber, and this reduces the flexibility of the backing.

In the mat made by compression moulding (the "Royal" mat), the bulk density of the mat backing was about 90% of the density of the material from which the crumb was made and is usually in the range of 80-95%. The backing is harder than the material from which the crumb was made because of the presence of the binder.

On the other hand, using the process according to the invention, the bulk density of the backing can be varied to lie within 45-90% of the density of the material from which the crumb was made. Preferably, the bulk density of the backing is made to lie within 45-70%, and more preferably within 55-70%, of the density of the crumb material. This provides a backing with a deformability of about 14-50%, more preferably 14-25%, which is better than that of a compression moulded mat and comparable to that of a conventional rubber backed mat. The invention also offers the advantage of a lighter weight mat that is more easily washed and dried and easier to carry and transport, whilst still being a rubber backed mat. This also has the advantage that the product density can be varied by a minor process change to enable production flexibility. Additives could also be included in the crumb and binder mix to further control or change the density if required.

Figure 5A:
FIGS. 5A to 5D are photographs showing in cross-section the structure of various rubber crumb backing layers.

The effect of different formation pressures on the structure of the backing layer is shown photographically in FIGS. 5A to 5D. FIG. 5A shows a cross-section at a magnification of about 10× through a backing layer made up from 1.5 mm rubber granules together with 8% MDI binder and 5% yellow oxide (which was added to binder to improve its visibility), and pressed at a pressure of 2 psi (14 kPa). Some of the granules were coloured blue and others were coloured black, to allow the boundaries between the granules to be seen more easily (the blue granules appear a lighter shade of grey). The individual granules can be easily identified and are substantially undeformed, having straight edges and sharp corners. The granules are packed together as a loose conglomeration giving the backing a sponge-like appearance. Many voids can be seen between the granules, those voids being generally only partially filled with binder.

Figure 5B:

FIG. 5B shows a similar backing, produced at a pressure of 10 psi (69 kPa). The backing has a tighter, more compact structure and some slight deformation of the granules can be seen. This increases the area of contact between adjacent granules and increases the tear strength of the backing. Nevertheless, many voids are still visible between the granules, which are only partially filled with binder.

Figure 5C:
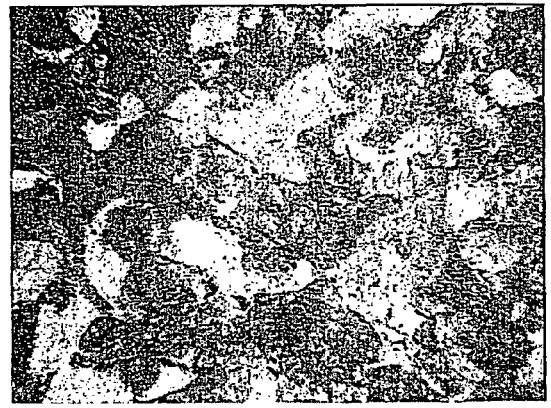

FIG. 5C shows a backing made using the same mixture of granules and binder, but using a compression moulding process in a 20 tonne press. In this case, severe deformation of the granules has taken place and the boundaries between adjacent granules are almost unidentifiable, except where the granules have different colours. The backing layer is dense and virtually solid, with hardly any voids between the granules.

Figure 5D:

FIG. 5D shows a cross-section through a conventional compression moulded mat (the prior art "Royal" mat). As with the backing layer shown in FIG. 5C, the boundaries between adjacent granules are almost unidentifiable and the backing layer is dense and solid, with hardly any voids (except where the backing layer has fractured).

Tear Strength Test

To test the strength of the granulated rubber backing, a batch of samples was made up using different formation pressures, ranging from no pressure in the air bag through to 8 psig (55 kPa).

All the rubber backing samples so formed were set or pressed at 125° C. for 10 minutes. Six test pieces were then cut from each sample and the tear strength of each test piece was measured, with three measurements being made in each of two orthogonal directions. The results are shown in Table 4.

TABLE 4

Tear Strength Test Data

| Formation Pressure psi (kPa) | Tear Strength— Direction 1 N/mm$^2$ | | | Tear Strength— Direction 2 N/mm$^2$ | | | Average tear strength N/mm$^2$ |
|---|---|---|---|---|---|---|---|
| | Test 1 | Test 2 | Test 3 | Test 4 | Test 5 | Test 6 | |
| 0 (0) | 0.09 | 0.11 | 0.06 | 0.08 | 0.06 | 0.08 | 0.08 |
| 2 (14) | 0.89 | 0.88 | 0.95 | 0.82 | 0.98 | 0.81 | 0.89 |
| 4 (28) | 1.59 | 1.56 | 1.51 | 1.48 | 1.45 | 1.48 | 1.51 |
| 8 (55) | 1.41 | 1.55 | 1.57 | 1.52 | 1.55 | 1.48 | 1.51 |

Table 4 shows that there is a correlation between formation pressure and tear strength, the strength increasing rapidly up to a formation pressure of about 4 psi (28 kPa), but with no significant additional increase in strength at higher formation pressures. We have found that a tear strength of about 0.8N/mm$^2$ or higher is quite adequate for many mat applications, even though this is considerably less than the tear strength of a conventional solid rubber mat backing.

Pile Crush Test

For this test, we made a number of mat samples, each including a tufted pile surface and a rubber crumb backing made using the same pressing temperature, time and pressure values as set out in Table 2. The extent of pile crush and the commercial acceptable of the different mat samples were then assessed subjectively. We found that for pressures of about 8 psig (55 kPa) and lower, pile crush was relatively minor and the product was commercially acceptable. However, at pressures above about 8 psig (55 kPa), significant pile crush occurred and the product was considered commercially unacceptable without subsequently being laundered or processed in some other way to raise the pile. The preferred tufted pile mats are therefore those manufactured at a pressure of about 8 psig (55 kPa) or less, which have backings with a bulk density in the range 45-70% of the density of the solid rubber material from which the rubber crumb is derived. The best mats were those manufactured at pressures of 2-8 psig (14-55 kPa), which have a bulk density in the range of about 55-70%.

Low Temperature Recovery Test.

For this test a 300 mm×200 mm sample of each product to be tested was conditioned at a room temperature of 22° C. for 2 hours and then rolled lengthwise around a 40 mm diameter tube and secured with a cable tie. The samples were then placed in a freezer and kept at a temperature of −16° C. for 24 hours. The samples were removed from the freezer, the cable tie was cut and the samples were then left at 22° C. for 10 minutes to relax on a flat, wood surface. Measurements were then made of the height, if any, of the ends of the mat samples above the flat surface due to the curl of the sample. Repeat measurements were made at 20 minutes and 60 minutes following removal from the freezer.

Table 5 shows the results of the above test when comparing: a conventionally backed nitrile rubber mat (A), a commercially available mat backed with PVC (B), a prior art rubber crumb backed mat formed by compression moulding in a fixed platen press to form a very dense backing (the "Royal" mat), and a mat according to the invention backed with granulated nitrile rubber crumb (D).

TABLE 5

| | Prior art mats | | | Inventive mat |
|---|---|---|---|---|
| Time | A: Regular rubber backed mat | B: PVC backed mat | C: Compression moulded mat | D: Rubber crumb backed mat |
| +10 minutes | Flat (0 mm) | 37 mm | 50 mm | 10 mm |
| +20 minutes | Flat (0 mm) | 7 mm | 6 mm | Flat (0 mm) |
| +60 minutes | Flat (0 mm) | 2 mm | 2 mm | Flat (0 mm) |

The mat according to the invention outperforms both the PVC backed mat and the compression moulded rubber crumb mat and it is not significantly different in performance from a high specification conventional rubber backed mat.

Sand Retention Test.

For this test two equal size samples of a mat (0.05781 m$^2$) were cut out. Each sample was weighed. They were then fixed to the inside of a tetrapod chamber. A tetrapod is a known piece of testing equipment used to measure wear of carpeting and the like. 1000 g of dry sand with a particle size distribution as shown in Table 6 was added along with five golf balls to provide agitation.

TABLE 6

| Particle size mm | Weight % |
|---|---|
| 0.00–0.25 | 7.0 |
| 0.25-0.50 | 71.0 |
| 0.50-0.71 | 15.7 |
| 0.71-1.00 | 3.5 |
| 1.00-2.00 | 1.7 |
| 2.00-2.80 | 0.16 |
| 2.80-4.00 | 0.02 |
| 4.00-6.70 | 0 |
| 6.70 and above | 0 |

The chamber was then sealed to prevent either the golf balls or the sand leaking out during the test and it was set revolving for 1000 revolutions. On completion of the test, each sample was removed and the weight increase of the sample recorded. The amount of sand retained in each sample was then calculated and expressed as the amount of dry sand retained in g/m$^2$.

Two mats with identical tufted pile construction were subjected to this test. The first mat was a tufted nylon cut pile conventional rubber backed mat, which had been fabricated in an air bag press at 165° C. and 30 psi (207 kPa). The mat was not washed prior to the test. The second mat was a tufted nylon cut pile mat with a rubber crumb backing, which had also been fabricated in an air bag press but at a lower temperature and pressure. The sand retention results were as follows:

Sample of prior art conventional rubber backed mat A: weight increase=723 g/m$^2$ Sample of inventive crumb rubber backed mat B: weight increase=2655 g/m$^2$ Production of a conventional rubber backed mat significantly flattens the pile on the mat. The lower temperature and pressure possible when using the same type of press (with a pressurised air bag and a heated platen) to produce a rubber crumb-backed, textile pile-faced mat according to the invention results in a mat that does not suffer significantly from pile crush. This gives a mat having, immediately after manufacture, good dust control properties without being laundered. This good dust control performance is exemplified by a sand retention value in excess of 2000 g/m$^2$ for the typical nylon tufted pile used in this test. The sand retention performance for a mat according to the invention is far superior to the sand retention performance of the conventional rubber-backed tufted nylon cut pile mat, prior to washing. The uncrushed pile also exhibits better "feel" by way of a more luxurious texture.

The mats made according to the invention exhibit superior fire resistance to those made from conventional nitrile rubber backing of the same thickness. When tested according to BS4790, mats made from powder nitrile rubber crumb and granule nitrile rubber crumb showed significantly higher resistance to ignition when compared to a mat made from conventional nitrile rubber backing. This is recorded in Table 7.

TABLE 7

| | Regular mat with solid rubber backing | Mat with crumb granule backing |
|---|---|---|
| Time to extinguish (s) | 170 | 50 |
| Radius of effects top (mm) | 50 | 25 |
| Radius of effects lower (mm) | 50 | 25 |

This can be further improved by the addition of more binder and/or anti-flammability additives to the backing and is especially useful when used in conjunction with a low flammability textile surface. Such a low flammability textile surface may, for example, be one that is predominantly a woollen construction.

When compared with PVC backed mats, the mats made according to the invention that have 4 mm or larger crumb rubber in the backing have better resistance to movement on carpets. On average, these mats display significantly improved resistance to movement on carpets compared with PVC backed mats.

Figure 6:
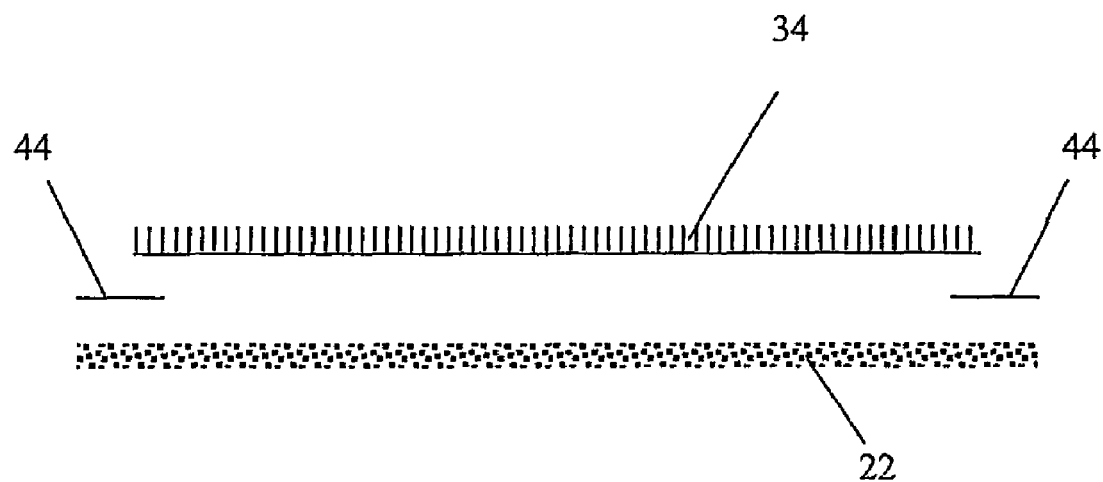
FIG. 6 is an exploded side view of a laid-up mat assembly, prior to pressing, according to a second embodiment of the invention.

A modified mat and a method of manufacturing the modified mat will now be described with reference to FIGS. 6 and 7. FIG. 6 is an exploded side view of a laid-up mat assembly, prior to pressing, which includes a backing layer 22 comprising a mixture of rubber crumb and a binder, and a layer of fabric 34 that will form the textile layer 1 of the mat. An edging strip 44 is located adjacent each edge of the backing layer 22, between the backing layer and the fabric layer 34. The fabric layer overlaps the edging strip 44 by about 1-2 cm. The edging strip 44 may be made for example of unvulcanised rubber, and may have a thickness of typically 0.35-0.45 mm and a width of 2-5 cm.

Figure 7:
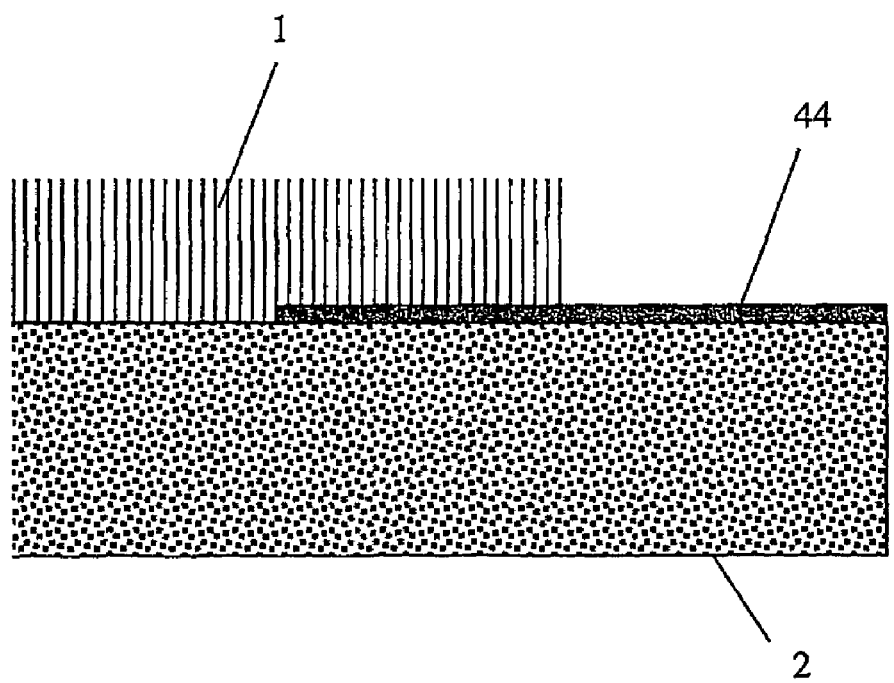
FIG. 7 is an enlarged partial cross-sectional side elevation of a mat made according to the second embodiment of the invention.

FIG. 7 is an enlarged cross-sectional side elevation of the modified mat, showing an edge portion of the mat after completion of the pressing operation. The rubber crumb/binder mixture has been consolidated to form a backing layer 2 and the fabric layer has been bonded to the backing layer to form the textile layer 1 of the mat. The edging strip 44 is bonded to the upper face of the rubber crumb backing layer 2 and is partially overlapped by and bonded to the textile layer 1.

The edging strip 44 hides the rubber crumb backing layer 2 so that the border portion of the mat has the appearance of a conventional rubber backed mat with a solid rubber backing. This may be desirable in certain circumstances for aesthetic reasons. It also prevents dust and dirt from collecting in the small voids between the crumbs in the upper face of the rubber border to provide a cleaner appearance. In addition, the edging strip increases the tear strength of the mat border. This in turn allows a larger crumb size to be used, which reduces costs and provides increased stability on carpeted surfaces.

Edging strips 44 may be provided on just the two longitudinal side edges of the mat (particularly in the case of continuous matting), or on all four edges of the mat. The strips 44 may be bonded to the backing layer 2 and the textile layer 1 by vulcanisation during pressing, or by using a glue or a thermoplastic adhesive. The strips 44 may be made of other materials, including for example thermoplastic materials. The strips may also be pre-applied to the fabric layer, prior to pressing, either by glue or vulcanisation. After pressing, any portion of the backing layer that extends beyond the edging strip and, if necessary, the outer edge of the edging strip 44 may be trimmed off to provide a flush edge.

Other mats can also be made according to the invention including, for example, floor mats such as poster mats or foam sandwich mats, table mats, drinks mats and bar runners.

The invention claimed is:

1. A method of making a floor mat with a tufted pile textile surface and an elastomer backing, the method comprising the steps of (a) mixing elastomer crumbs and a binder, (b) depositing the crumb/binder mixture to form a crumb/binder layer, (c) placing a textile surface element comprising tufts of yarn tufted into a tufting substrate on the crumb/binder layer to form a mat assembly, (d) pressing the mat assembly in a heated press, the heated press having an inflatable diaphragm and a single heated platen having a plurality of zones, a first zone being a low temperature zone and a second zone being a higher temperature zone, said pressing step being used to set the binder, thereby consolidating the elastomer crumbs comprising the crumb/binder layer to form an elastomer backing that includes voids between the elastomer crumbs, and bonding the textile surface element to the elastomer backing, wherein the mat assembly is pressed at a pressure in the range 2-8 psig (14-55 kPa) and is heated at a maximum temperature of 200° C. or less to form an elastomer backing with a density in the range 0.5 to 0.9 g/cm$^3$, wherein the elastomer backing thickness has a deformability of about 14-25% when the thickness is measured after application of 60 g weight and a 800 g weight are applied to the backing with a 10 mm diameter foot, wherein the mat assembly is pressed in a plurality of stages, wherein the thickness of the elastomer backing comprising the mat assembly is within the range of 60 to 100% of the thickness of the unpressed crumb/binder layer, wherein the mat assembly is transported through the press on a conveyor, and wherein the crumb/binder mixture is deposited on the conveyor using a spreader device that moves at a constant speed relative to the conveyor.

2. A method according to claim 1, wherein the thickness of the elastomer backing comprising the mat assembly is within the range of 65 to 85% of the thickness of the unpressed crumb/binder layer.

3. A method according to claim 1 wherein the mat assembly is pressed at a maximum temperature in the range 110° C. to 140° C.

4. A method according to claim 1 wherein the mat assembly is pressed at a maximum temperature of about 125° C.

5. A method according to claim 1 wherein the binder is selected from the group comprising thermosetting and water curable polymeric materials and mixtures thereof, and the mat assembly is pressed in a plurality of stages including at least one low temperature stage followed by at least one higher temperature stage.

6. A method according to claim 1 wherein the binder is selected from the group comprising Thermoplastic polymeric materials, hot melt binders and mixtures thereof, and the mat assembly is pressed in a plurality of stages including at least one high temperature stage followed by at least one lower temperature stage.

7. A method according to claim 1 wherein the mat assembly is transported through the press in a plurality of steps, so that it is pressed sequentially in each of the plurality of zones.

8. A method according to claim 1 wherein the spreader device includes a vibrating doctor blade.

9. A method according to claim 1 wherein the textile surface element placed on the crumb/binder layer is a continuous textile surface element.

10. A method according to claim 1 wherein separate textile surface elements are laid consecutively on the crumb/binder layer.

11. A method according to claim 1 wherein mat borders are produced by spreading the crumb/binder mixture over a larger area than the textile element or elements.

12. A method according to claim 1 wherein the elastomer crumb is crumbed vulcanized rubber.

13. A method according to claim 1 wherein that the elastomer backing has a bulk density in the range 45 to 70% of the solid density of the elastomer crumb material.

14. A method according to claim 1 wherein the elastomer crumb is crumbed vulcanized nitrile rubber and the elastomer backing has a bulk density in the range 45 to 70% of the solid density of the elastomer crumb material.

15. A method according to claim 14 wherein the elastomer backing has a density in the range of from 0.7 g/cm$^3$ to 0.9 g/cm$^3$.

16. A method according to claim 14 wherein the elastomer backing has a bulk density in the range 55 to 70% of the solid density of the elastomer crumb material.

17. A method according to claim 16 wherein the Crumb/binder mixture includes at least 10% by weight powdered elastomer crumb and from 9 to 20% binder.

18. A method according to claim 14 wherein the crumb size is substantially in the range of 2 to 4 mm.

19. A method according to claim 1 wherein the elastomer backing has a thickness of at least 1 mm.

20. A method according to claim 1 wherein the crumb/binder mixture includes at least 10% by weight powdered elastomer crumb.

21. A method according to claim 1 wherein the crumb/binder mixture includes less than 1% by weight powdered elastomer crumb and from 2 to 12% of binder.

22. A method according to claim 1 wherein the crumb/binder mixture includes from 2 to 20% by weight of binder.

23. A method according to claim 1 wherein the binder is a polyurethane MDI binder.

24. A method according to claim 23 in which the binder is selected from the group consisting of (i) a 4,4-methylene di-p-phenylene isocyanate (MDI) polyurethane one-component adhesive and (ii) a 4,4-methylene di-p-phenylene isocyanate (MDI) polyurethane two-component adhesive.

25. A method according to claim 23 in which the binder is a solvent-free one component polyurethane adhesive.

26. A method according to claim 1 wherein the binder is a hot melt binder.

27. A method according to claim 1 wherein the crumb/binder mixture includes powdered additives selected from the group consisting of anti microbial additives, anti-flammability additives, pigments, and anti-static additives.

28. A method according to claim 1 wherein an edging strip is bonded to the elastomer backing adjacent at least one edge thereof.

29. A method according to claim 28 wherein the textile surface element partially overlaps and is bonded to the edging strip.

* * * * *